Figure 1:
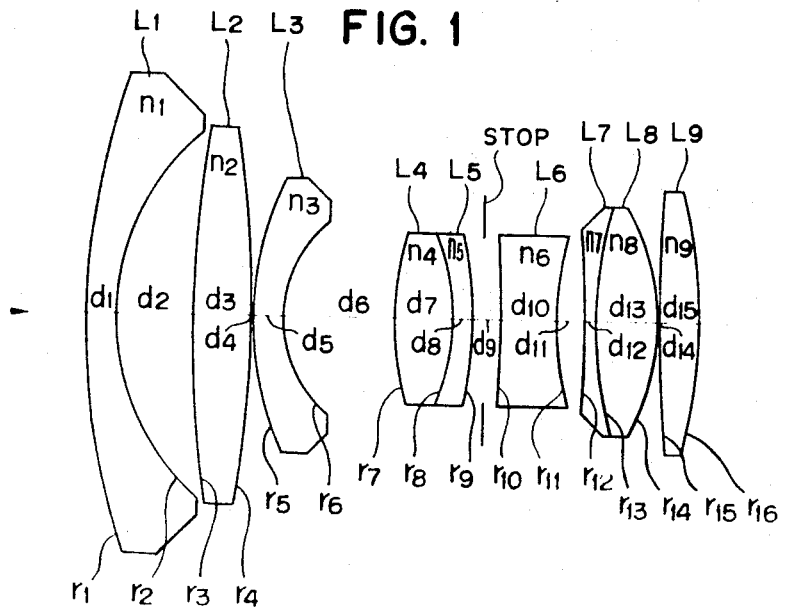

United States Patent

[11] 3,622,227

[72] Inventor Yoshiyuki Shimizu
1-68, Tamagawa Yohga-machi Setagaya-ku, Tokyo, Japan
[21] Appl. No. 888,041
[22] Filed Dec. 24, 1969
[45] Patented Nov. 23, 1971
Continuation-in-part of application Ser. No. 611,206, Dec. 27, 1966, now abandoned. This application Dec. 24, 1969, Ser. No. 888,041

[54] RETROFOCUS-TYPE WIDE-ANGLE CAMERA LENS
2 Claims, 2 Drawing Figs.
[52] U.S. Cl. .................................................. 350/214
[51] Int. Cl. .................................................. G02b 9/64
[50] Field of Search ........................................ 350/214, 215

[56] References Cited
FOREIGN PATENTS
83,412 6/1964 France ........................ 350/214
1,396,907 3/1965 France ........................ 350/214

Primary Examiner—John K. Corbin
Attorney—Anton J. Wille

ABSTRACT: A retrofocus-type wide-angle camera lens is provided in which the back focus is especially long compared to the composite focal length. The lens comprises a front lens group having a negative composite focal length and a rear lens group consisting of a cemented positive lens, a negative single lens, a composite positive meniscus lens, and a single positive lens. The lens thus provided has an aperture ratio of F/2.8 and a viewing angle of over 80° with various aberrations, coma, curvature of the field and distortion highly corrected.

SPHERICAL ABERRATION
SINUSOIDAL CONDITION

ASTIGMATISM

DISTORTION

RETROFOCUS-TYPE WIDE-ANGLE CAMERA LENS

This application is a continuation-in-part of my copending application bearing Ser. No. 611,206 filed on Dec. 27, 1966, now abandoned.

This invention relates to a retrofocus-type wide angle camera lens.

In a single lens reflex camera, the back focus of the objective lens is restricted because of the operation of the reflecting mirror, and it is necessary that the back focus (B,f) of the objective lens of, for example, a 35 mm. camera should be longer than about 35 mm. Under such restrictions, it has been difficult to obtain a super wide angle lens because distortion and coma aberration are increased as the angle of view is increased although a retrofocus type objective lens has hitherto been used in order to obtain a wide angle objective lens whose focal length was shorter.

On the one hand, the increase in spherical aberration is not serious insofar as a wide angle lens is concerned, but the increase of astigmatism and distortion is detrimental to the quality of the image, and therefore the correction of these aberrations must be solved.

The object of the present invention is to provide a retrofocus-type wide angle lens in which astigmatism and distortion are highly corrected.

In accordance with the present invention, there is provided a retrofocus-type wide angle camera lens in which the back focus is especially long compared to the composite focal length, an aperture ratio of F/2.8 and a viewing angle of over 80° being provided and in which the various kinds of aberrations, in particular, coma, curvature of field and distortion are highly corrected.

Figure 2:
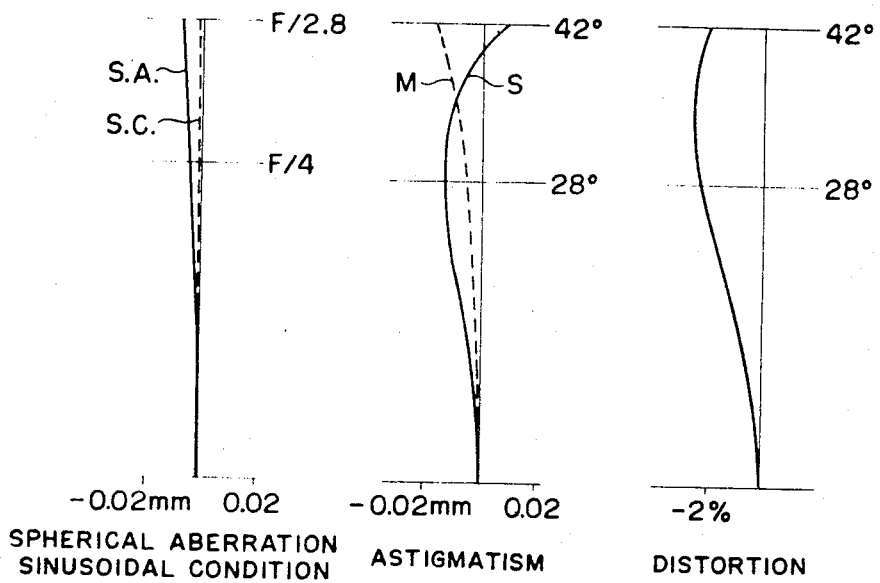

Other objects, advantages and features of the present invention will become more apparent from the following description of an illustrative embodiment in conjunction with the drawing in which FIG. 1 is a cross-sectional view of retrofocus-type wide angle lens according to the present invention; and FIG. 2 shows the various aberration curves of the lens illustrated in FIG. 1.

As viewed from the direction in which light rays are incident, $L_1$ is a negative single meniscus lens with the convex surface directed towards the object, $L_2$ is a positive single lens, and $L_3$ is a negative meniscus lens with the convex surface directed towards the object, the three lenses comprising the front group of the lens, the composite focal length of which is negative. Separated by a comparatively large air space $d_6$ from the lens $L_3$ is a cemented positive element comprising a positive lens $L_4$ and a negative meniscus lens $L_5$. Separated by air space $d_9$ is a negative lens $L_6$ followed by a composite meniscus lens formed by a negative lens $L_7$ and a positive lens $L_8$. A single positive lens $L_9$ completes the rear group.

The lens arrangement is such that the following conditions are met:

(1) $\quad 0.5d_9 < d_{11} < 2d_9$ (2) $\quad \dfrac{n_5 - n_4}{r_8} \geq 0$ (3) $\quad |r_{10}| > |r_{11}|$ (4) $\quad \dfrac{n_8 - n_7}{r_{13}} < 0$ Where $d$ and its subscript designate distance along the optical axis and $n$ and its subscript designate the refractive indices designated on the drawing and hereinafter fully set forth. The present invention is characterized by the above mentioned conditions, and the gist of the present invention, resides in the fact that the composite focal length of the front group lenses $L_1$ to $L_3$ is made negative to form a virtual image of the object, the virtual image being formed at an indefinite distance by means of the group of lenses $L_4$ to $L_8$ (Tessa-type lens is provided in the opposite direction, and single convex lenses are made into a cemented lens of $L_7$ and $L_8$). By means of lens $L_9$, the real image is formed at a predetermined position. In order to obtain an image whose aberrations are highly corrected it is necessary to correct various aberrations of the first virtual image, and for that purpose, the correction of chromatic aberration is carried out by constituting lens $L_1$ a negative lens. Other aberrations such as spherical aberration, coma, image curving, distortion, and the like, are not highly corrected, but these aberrations are sufficiently corrected by the rear group of lenses.

The lenses $L_4$, $L_5$, $L_6$, $L_7$, $L_8$ and $L_9$ are lens groups having a positive refractive power and the groups of lenses $L_4$ to $L_8$ has a shape and refractive power nearly equal to that of the known Tessa, or triplet lens type arranged oppositely. This aims to focus at infinity the virtual image formed by lenses $L_1$ to $L_3$ through the aid of lenses $L_4$ to $L_8$. The lens $L_9$ gives a predetermined focal length to constitute the whole lens system.

A Tessa-type lens is principally a symmetrical lens type although its symmetry is somewhat deformed. The central negative lens is provided for correcting spherical aberration and axial chromatic aberration and astigmatism. For this purpose, it is most effective to place it at the central position, since the negative lens if located at the central position, has little effect on distortion and magnification chromatic aberration. Lenses $L_4$ to $L_8$ adopt this idea of the Tessa-type and this is expressed as $0.5d_9 < d_{11} < 2d_9$. With this condition, the negative lens $L_6$ should be placed substantially intermediate of the positive lens groups $L_4$, $L_5$ and $L_7$, $L_8$.

In other words, the condition (1) is effective for producing a plane image, and it is the condition for placing the lens $L_6$ almost in the middle between the composite lens $L_4$, $L_5$ and composite lens $L_7$, $L_8$. When so arranged, the main light rays pass through almost the center of lens $L_6$ (near to the optical axis), minimizing the adverse effects of astigmatism, at the same time constraining spherical aberrations. When such conditions herein proposed is changed, the main light rays pass through the periphery of $L_6$ (the marginal portion of lens), and not only astigmatism but also the spherical aberration is increased.

The object of the condition (2) is to correct distortion and the internal coma generated by the oblique light rays, i.e., the light rays coming into the system from the outside of the main light rays of the light coming in at a predetermined angle against the lens, such aberration being experienced in the lens system of this kind. In other words, surface $r_8$ of lens $L_4$ is formed in the negative curved surface, and therefore the difference of the angle of incidence caused by the difference of the height of incidence of said oblique light rays, becomes larger. Thus the oblique light rays are greatly refracted and the internal coma generated by the front group of lenses $L_1$ to $L_3$ can be sufficiently corrected. If the condition is reversed, the internal coma generated in the front group of lenses is increased, and correction by the rear group of lenses becomes difficult.

Lenses $L_1$, $L_2$ and $L_3$ constitute a lens group having a negative refractive power. However, when the position of the entrance pupil is behind the lens group, the negative lens has a tendency to coma aberration. In this invention, the negative lens group of $L_1$, $L_2$ and $L_3$ produces internal coma aberration, which must be compensated. Condition (2) was determined for correcting the internal coma produced relative to the light rays incident at a position far away from the optical axis. The stop of the lens system according to this invention is behind the lenses $L_4$ and $L_5$ so that when the light rays pass through $r_8$, the light rays receive large refraction due to the negative radius of curvature of $r_8$ and refractive indexes $n_4$, $n_5$ so as to approach to the main light rays. Since the internal coma aberration of the light rays incident externally of the main light rays is caused by the refraction of said light rays in the direction deviating too much from the main light rays, the above-mentioned condition plays a role to compensate for such coma aberration.

The object of the condition (3) is to correct the internal coma generated by the aslant light rays, i.e., the light rays coming into the system from inside of the main light rays coming in at a predetermined angle against the lens. In other words, the angle of incidence of the aslant light rays onto surface $r_{11}$ of lens $L_6$ is larger than the angle of incidence of the aslant light rays coming onto surface $r_{10}$ of lens $L_6$ and the refraction by the surface $r_{11}$ becomes larger than the refraction by the surface $r_{10}$. However, when the direction of the sign of inequality is reversed while keeping the sum of the refractive powers of $r_{10}$ and $r_{11}$ constant, the change of Petzval's sum is small, and therefore the effectiveness in correcting astigmatism is decreased. The difference of refraction caused by the difference of the height of incidence of the light rays passing through lens $L_6$ is further decreased and therefore it is useless for the correction of the aberration.

Condition (3) is then to compensate the internal coma aberration of the light rays incident at the position nearer to the optical axis than the main light rays. In this invention, the stop is positioned intermediate of lenses $L_5$ and $L_6$ so that the light rays incident internally of the main light rays will pass lens $L_6$ externally of the main light rays and the height of said light rays passing through $r_{11}$ becomes higher than that of the light rays passing through the lens $r_{10}$. Since $r_{11}$ has a positive radius of curvature, the negative lens $L_6$ should bend toward the image field side, so that the light rays receive a large refraction by $r_{11}$ to depart from the main light rays. This results in the correction of the internal coma aberration. This effect is further assured by the condition (1), i.e., $0.5d_9 < d_{11} < 2d_9$, which assures passage of the main light rays through substantially the central portion of the lens $L_6$. The light path thereof is not effected too much by the bending of the lens $L_6$.

The object of the condition (4) is to attain the same object and effect of the condition (3). Namely, surface $r_{11}$ of lens $L_6$ corrects the internal coma of the light rays coming into the system from inside of the main light rays of the light flux coming in at a predetermined angle, but the internal coma is further corrected by the surface $r_{13}$ between lenses $L_7$, $L_8$. This correction is carried out in such a manner that it increases the refractive index $n_7$ of the negative lens $L_7$ and decreases the refractive index $n_8$ of the lens $L_8$ whereby the curving in the positive direction generated on the sagittal image surface is compensated in the negative direction. If the direction of the sign of inequality is reversed, the angle of incidence of the oblique light rays becomes smaller and becomes useless for the correction of the internal coma generated in the front groups.

Condition (4) is thus determined for achieving two purposes. As is well known, it is necessary to make the refractive index $n_7$ of the negative lens $L_7$ larger than $n_8$ of the positive lens $L_8$ so as to curve the sagittal image plane toward the object side, i.e., negative. The other purpose is to compensate the internal coma aberration due to $r_{11}$ of the light rays incident internally of the main light rays. The result of this condition is substantially the same as for $r_8$, i.e., the cemented surface of lenses $L_4$ and $L_5$.

The image of the object is formed at almost indefinite distance through lenses $L_1$ to $L_8$ when the above given conditions are satisfied, but it is not always necessary to form the image of the object at the indefinite distance. When the absolute value of the composite focal length of the lens system from $L_1$ to $L_8$ is less than twice the composite focal length of the whole lens system, and is in the positive, the composite focal length of the lens system from $L_4$ to $L_8$ becomes shorter, and the correction required becomes excessive, and the correction of aberrations difficult. On the other hand, when it is a negative value, it would be necessary for lens $L_9$ to have remarkably great refractive power. This also brings about poor balance, and the correction of aberration becomes difficult. Therefore, the composite focal length of the lens group from $L_1$ to $L_8$ should be preferably more than twice as much as the composite focal length of the whole lens system, and the virtual image or the real image formed at the indefinite distance can be formed as the real image at the rear of the lens by means of the lens $L_9$.

As a matter of fact, in addition to the conditions given above, various kinds of conventional means for correcting aberrations are employed, and as a result, a retrofocus-type wide angle camera lens, having an aperture ratio of F/2.8, an angle of view of over 80°, the back focus of which is over $1.5f$, and which has been highly corrected for coma, image-surface curving and other aberrations, has been obtained.

The following are the examples of the present invention.

EXAMPLE I $f=1.0$    B.f=1.5597    $2\Omega=84°$    F:2.8

| | | nd | vd |
|---|---|---|---|
| $r_1=+2.5000$ | | | |
| | $d_1=0.1125$ | $n_1=1.62041$ | 60.3 |
| $r_2=+0.8958$ | | | |
| | $d_2=0.2625$ | | |
| $r_3=+3.7500$ | | | |
| | $d_3=0.2292$ | $n_2=1.62041$ | 60.3 |
| $r_4=-3.7500$ | | | |
| | $d_4=0.0042$ | | |
| $r_5=+1.2500$ | | | |
| | $d_5=0.1125$ | $n_3=1.62041$ | 60.3 |
| $r_6=+0.4583$ | | | |
| | $d_6=0.4083$ | | |
| $r_7=+1.0521$ | | | |
| | $d_7=0.1667$ | $n_4=1.62004$ | 36.3 |
| $r_8=-0.7742$ | | | |
| | $d_8=0.1250$ | $n_5=1.51823$ | 59.0 |
| $r_9=-1.4542$ | | | |
| | $d_9=0.1042$ | | |
| $r_{10}=-3.5417$ | | | |
| | $d_{10}=0.2208$ | $n_6=1.7847$ | |
| $r_{11}=+1.3500$ | | | |
| | $d_{11}=0.0979$ | | |
| $r_{12}=-5.0000$ | | | |
| | $d_{12}=0.0417$ | $n_7=1.7847$ | 26.1 |
| $r_{13}=+1.1729$ | | | |
| | $d_{13}=0.2250$ | $n_8=1.62041$ | 60.3 |
| $r_{14}=-0.8333$ | | | |
| | $d_{14}=0.0042$ | | |
| $r_{15}=+8.0000$ | | | |
| | $d_{15}=0.1458$ | $n_9=1.744$ | 44.9 |
| $r_{16}=-1.9423$ | | | |

EXAMPLE II $f=1.0$    B.f=1.5032    $2\Omega=80°$    F:2.8

| | | nd | vd |
|---|---|---|---|
| $r_1=+2.0873$ | | | |
| | $d_1=0.180$ | $n_1=1.62041$ | 60.3 |
| $r_2=+0.7842$ | | | |
| | $d_2=0.300$ | | |
| $r_3=+4.6000$ | | | |
| | $d_3=0.552$ | $n_2=1.6228$ | 56.9 |
| $r_4=-2.9420$ | | | |
| | $d_4=0.004$ | | |
| $r_5=+1.1160$ | | | |
| | $d_5=0.092$ | $n_3=1.58913$ | 61.2 |
| $r_6=+0.4520$ | | | |
| | $d_6=0.232$ | | |
| $r_7=+0.8400$ | | | |
| | $d_7=0.200$ | $n_4=1.57501$ | 41.3 |
| $r_8=-0.8400$ | | | |
| | $d_8=0.054$ | $n_5=1.56248$ | 50.9 |
| $r_9=-1.4709$ | | | |
| | $d_9=0.088$ | | |
| $r_{10}=-40.0000$ | | | |
| | $d_{10}=0.160$ | $n_6=1.51823$ | 59.0 |
| $r_{11}=+0.9280$ | | | |
| | $d_{11}=0.112$ | | |
| $r_{12}=-0.9200$ | | | |
| | $d_{12}=0.028$ | $n_7=1.7847$ | 26.1 |
| $r_{13}=+1.1768$ | | | |
| | $d_{13}=0.180$ | $n_8=1.6679$ | 55.5 |
| $r_{14}=-0.7440$ | | | |
| | $d_{14}=0.004$ | | |
| $r_{15}=-8.8000$ | | | |
| | $d_{15}=0.104$ | $n_9=1.76684$ | 46.2 |
| $r_{16}=-0.9616$ | | | |

In the above examples, $r_1 r_2 \ldots$, represent the radii of curvature of the respective elements, $d_1 d_2 \ldots$, the axial thicknesses of the respective elements and the air spaces of the adjacent elements, $n_1 n_2$...., the refractive indices of the respective elements and $vd$..., the Abbe numbers for the glasses of respective elements.

Seidel aberration coefficients of Example I are given below:

| r | I | II | III-IV | IV | V |
|---|---|---|---|---|---|
| 1 | 0.0151218 | 0.0243690 | 0.0785414 | 0.1924196 | 0.3100842 |
| 2 | -1.2116956 | 0.1849224 | -0.0564436 | -0.4556300 | 0.0695358 |
| 3 | 0.1940116 | 0.1327508 | 0.1816670 | 0.1929328 | 0.1320126 |
| 4 | 0.0020366 | -0.0084990 | 0.0709364 | 0.1375674 | -0.5740902 |
| 5 | 0.2697854 | 0.1225240 | 0.1112896 | 0.3619426 | 0.1643776 |
| 6 | -14.7832946 | 1.9467302 | -0.5127082 | -1.0917724 | 0.1437694 |
| 7 | 8.2949876 | 1.0188750 | 0.2502972 | 0.4889270 | 0.0600550 |
| 8 | 1.1427144 | -0.3703238 | 0.2400244 | 0.17344778 | -0.0562194 |
| 9 | 2.4595612 | -1.1583944 | 1.0911522 | 0.7803018 | -0.3675034 |
| 10 | -0.8247514 | 0.5723000 | -0.7942446 | -0.5212666 | 0.3617100 |
| 11 | -1.9778536 | -0.9953438 | -1.0018022 | -0.8265912 | -0.4159774 |
| 12 | 0.0175012 | 0.0588448 | 0.3957122 | 0.1099196 | 0.3695872 |
| 13 | -1.6245810 | -0.5333596 | -0.3502104 | -0.2235402 | -0.0733896 |
| 14 | 4.5683924 | -0.6047468 | 0.1601082 | 0.5395192 | -0.0714194 |
| 15 | -0.0005906 | 0.0066302 | -0.1488556 | -0.0211022 | 0.2368840 |
| 16 | 4.4003996 | -0.7188146 | 0.2348398 | 0.3370592 | -0.0550592 |
| Σ | 0.9417450 | -0.3215354 | -0.0496962 | 0.1741644 | 0.2343562 |

In accordance with the present invention described it is possible to produce a small, light-weight, retrofocus-type wide angle camera lens wherein the angle of view is over 80°, and F is 2.8, and the back focus B.f is over 1.5 times more than the composite focal length, and in which the various kinds of aberrations are highly corrected over the whole angle of view. When the lens system of the present invention is mounted in a single lens reflex camera, it is not necessary to elevate the reflecting mirror in advance. The lens system of the present invention can be incorporated into a camera in the same manner as a conventional lens system.

What is claimed is:

1. A retrofocus-type wide angle camera lens system, of which the numerical data is as follows:

Focal length $f=1.0$
Back Focal Length B.f $=1.5597$
Angle of Field $2\omega=84°$
Aperture Ratio F:2.8

| | | nd | vd |
|---|---|---|---|
| $r_1=+2.5000$ | | | |
| | $d_1=0.1125$ | $n_1=1.62041$ | 60.3 |
| $r_2=+0.8958$ | | | |
| | $d_2=0.2625$ | | |
| $r_3=+3.7500$ | | | |
| | $d_3=0.2292$ | $n_2=1.62041$ | 60.3 |
| $r_4=-3.7500$ | | | |
| | $d_4=0.0042$ | | |
| $r_5=+1.2500$ | | | |
| | $d_5=0.1125$ | $n_3=1.62041$ | 60.3 |
| $r_6=+0.4583$ | | | |
| | $d_6=0.4083$ | | |
| $r_7=+1.0521$ | | | |
| | $d_7=0.1667$ | $n_4=1.62004$ | 36.3 |
| $r_8=-0.7742$ | | | |
| | $d_8=0.1250$ | $n_5=1.51823$ | 59.0 |
| $r_9=-1.4542$ | | | |
| | $d_9=0.1042$ | | |
| $r_{10}=-3.5417$ | | | |
| | $d_{10}=0.2208$ | $n_6=1.7847$ | |
| $r_{11}=+1.3500$ | | | |
| | $d_{11}=0.0979$ | | |
| $r_{12}=-5.0000$ | | | |
| | $d_{12}=0.0417$ | $n_7=1.7847$ | 26.1 |
| $r_{13}=+1.1729$ | | | |
| | $d_{13}=0.2250$ | $n_8=1.62041$ | 60.3 |
| $r_{14}=-0.8333$ | | | |
| | $d_{14}=0.0042$ | | |
| $r_{15}=+8.0000$ | | | |
| | $d_{15}=0.1458$ | $n_9=1.744$ | 44.9 |
| $r_{16}=-1.9423$ | | | | wherein $r_1 r_2$..... represent the radii of curvature of the respective elements; $d_1 d_2$..... represent the axial thicknesses of the respective elements and the air spaces of the adjacent elements; $n_1 n_2$..... represent the refractive indices of the respective elements; and $vd$..... represent the Abbe Numbers of the respective elements.

2. A retrofocus-type wide angle camera lens, of which the numerical data is as follows:

Focal Length $f=1.0$
Back Focal Length B.f $=1.5032$
Angle of Field $2\omega=80°$
Aperture Ratio F:2.8

| | | nd | vd |
|---|---|---|---|
| $r_1=+2.0873$ | | | |
| | $d_1=0.180$ | $n_1=1.62041$ | 60.3 |
| $r_2=+0.7842$ | | | |
| | $d_2=0.300$ | | |
| $r_3=+4.6000$ | | | |
| | $d_3=0.552$ | $n_2=1.6228$ | 56.9 |
| $r_4=-2.9420$ | | | |
| | $d_4=0.004$ | | |
| $r_5=+1.1160$ | | | |
| | $d_5=0.092$ | $n_3=1.58913$ | 61.2 |
| $r_6=+0.4520$ | | | |
| | $d_6=0.232$ | | |
| $r_7=+0.8400$ | | | |
| | $d_7=0.200$ | $n_4=1.57501$ | 41.3 |
| $r_8=-0.8400$ | | | |
| | $d_8=0.054$ | $n_5=1.56248$ | 50.9 |
| $r_9=-1.4709$ | | | |
| | $d_9=0.088$ | | |
| $r_{10}=-40.000$ | | | |
| | $d_{10}=0.160$ | $n_6=1.51823$ | 59.0 |
| $r_{11}=+0.9280$ | | | |
| | $d_{11}=0.112$ | | |
| $r_{12}=-0.9200$ | | | |
| | $d_{12}=0.028$ | $n_7=1.7847$ | 26.1 |
| $r_{13}=+1.1768$ | | | |
| | $d_{13}=0.180$ | $n_8=1.6679$ | 55.5 |
| $r_{14}=-0.7440$ | | | |
| | $d_{14}=0.004$ | | |
| $r_{15}=-8.8000$ | | | |
| | $d_{15}=0.104$ | $n_9=1.76684$ | 46.2 |
| $r_{16}=-0.9616$ | | | | wherein $r_1 r_2$..... represent the radii of curvature of the respective elements; $d_1 d_2$..... represent the axial thicknesses of the respective elements and the air spaces of the adjacent elements; $n_1 n_2$..... represent the refractive indices of the respective elements; and $vd$..... represent the Abbe Numbers of the respective elements.

* * * * *